United States Patent [19]

Ito

[11] Patent Number: 4,806,837

[45] Date of Patent: Feb. 21, 1989

[54] ROTARY ENCODER

[75] Inventor: Eiji Ito, Furukawa-shi, Japan

[73] Assignee: Alps Electric Co., Ltd, Japan

[21] Appl. No.: 142,139

[22] Filed: Jan. 7, 1988

[30] Foreign Application Priority Data

May 1, 1987 [JP] Japan .............................. 62-65201[U]

[51] Int. Cl.$^4$ .............................................. G05B 1/06
[52] U.S. Cl. ..................................... 318/653; 335/272
[58] Field of Search ............... 318/637, 638, 651, 652, 318/653; 335/270, 272

[56] References Cited

U.S. PATENT DOCUMENTS

| | | | |
|---|---|---|---|
| 4,328,450 | 5/1982 | Gabor ................................. | 318/561 |
| 4,600,871 | 7/1986 | Idogaki et al. ...................... | 318/653 |
| 4,737,698 | 4/1988 | McMullin et al. ................... | 318/653 |

Primary Examiner—William M. Shoop, Jr.
Assistant Examiner—David Martin
Attorney, Agent, or Firm—Guy W. Shoup; Paul J. Winters; Stephen L. Malaska

[57] ABSTRACT

Disclosed is here a rotary encoder having a recording medium including positional information arranged in a circumferential direction, sensors disposed opposing the positional information, and a driving shaft linked with a central position of the recording medium for detecting, based on a change in outputs from the sensors, the positional information of the recording medium rotated by means of the driving shaft. A link body is formed by achieving a bending work on an elastic plate such that bent lines of the elastic plate form a rectangular shape and that there are formed two pairs of opposing bent leg pieces, one of the two pairs of the opposing bent leg pieces is fixedly secured on the recording medium and the other one thereof is fixedly secured on a coupling body disposed in the proximity of the recording medium, and the driving shaft is inserted into and fixed on a shaft inserting hole formed in the coupling body.

5 Claims, 5 Drawing Sheets

ROTARY ENCODER

BACKGROUND OF THE INVENTION

1. Field of the Invention

The present invention relates to a rotary encoder, and in particular, to a link structure of a rotary body (a recording medium) on which positional information is formed and a drive shaft driving a rotary motion of the rotary body.

2. Description of the Prior Art

The rotary encoder is used when a positional information pattern is recorded on a rotary body as a recording medium in various methods such as an electromagnetic method, an optical method, and a mechanical method and the rotary angle of the rotary body is detected by a magnetic sensor, an optical sensor, or a mechanical sensor depending on the kind of the positional information pattern. The rotary encoder has been broadly utilized in various fields in association with the recent development of the mechatronics.

When using the rotary encoder, the rotary body must be directly linked to a driving shaft such as a drum shaft or a motor shaft depending on the detection object (for example, a drum or a motor of a copying machine) of which the rotary angle is to be measured. However, it is quite difficult to continuously maintain the arrangement of the rotary axis of the rotating body and the driving shaft on the same axial line, namely, there appear a shift of center between the axes thereof (eccentricity) and a shift of inclination therebetween (declination) to some extent with respect to the center lines of the rotating shaft of the rotary body and the driving shaft due to an error in the installation thereof and an error in manufacturing the rotary body and the driving shaft. Consequently, in the prior art technology, the rotating axis of the rotary body is linked with the driving shaft, for example, by means of a universal joint called a helical coupling manufactured by forming a helical groove in a surface of a cylindrical body, thereby absorbing the eccentricity and the declination.

However, in the link structure of the prior art technology, since both ends of the helical coupling must be fixed on the rotary shaft of the rotary body extruding from the rotary encoder and on the driving shaft disposed on the apparatus side by means of suitable means such as screws, the installation thereof becomes complicated and a dedicated space is required for the installation thereof, which leads to a disadvantage to minimize the size of the apparatus. Furthermore, although the helical coupling develops a satisfactory effect with respect to the declination because of the inflection thereof, the allowance for the eccentricity is small. Particularly, since the amount of eccentricity is generally greater than that of the declination in this kind of link structure due to the clearance of the installing holes and the like, there may arise a disadvantage in some cases that the rotation force of the driving shaft cannot be imparted to the rotary body.

SUMMARY OF THE INVENTION

It is therefore an object of the present invention to provide a rotary encoder which facilitates the installation to link the rotary body with the driving shaft and which is configured in a space-saving fashion and hence is suitable for miniturization of the size thereof, thereby solving the problems of the prior art technology.

The object of the present invention can be achieved by a rotary encoder including a recording medium having positional information arranged in a circumferential direction, sensors disposed to oppose the positional information, and a driving shaft linked to a central position of the recording medium for detecting the positional information of the recording medium rotated by means of the driving shaft based on a change in outputs from the sensors wherein an elastic plate undergoes a bending work such that a square shape is formed with bent lines and that a link body having two sets of bent leg pieces are formed, one set of the bent leg pieces is fixed to the recording medium, other set thereof is fixed to the coupling body disposed in the vicinity of the recording medium, and the driving shaft is inserted into and fixed on a shaft inserting hole formed in the coupling body.

According to the means above, through a simple operation that after the driving shaft is inserted into the shaft inserting hole of the coupling body beforehand attached to the rotary encoder, the coupling body is fixed to the driving shaft by a suitable means such as a screw and an adhesive, the recording medium disposed in the rotary encoder can be linked with the driving shaft arranged on the apparatus side. Furthermore, since the coupling body is attached to the recording medium via link body attained by achieving a forming work on a plate spring, when the respective bent leg pieces of the link body elastically deform in the respective directions of the thickness of the plates, a displacement in the X-Y direction can be achieved in a plane orthogonal to the center or rotation of the rotary medium and hence the absorption of the eccentricity caused between the recording medium and the driving shaft can be guaranteed. In addition, since the respective bent leg pieces of the link body are not easily deformed in the direction orthogonal to the thickness of the plate, the linked body develops a strong rigidity in the rotary direction of the driving shaft and consequently the driving force can be imparted from the driving shaft to the recording medium almost without any time loss. Moreover, since the coupling body and the link body can be arranged in a casing as an outer shell of the rotary encoder, the space for the installation thereof is minimized to the maximum extent, which enables to reduce the size of an apparatus in which the rotary encoder is installed.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
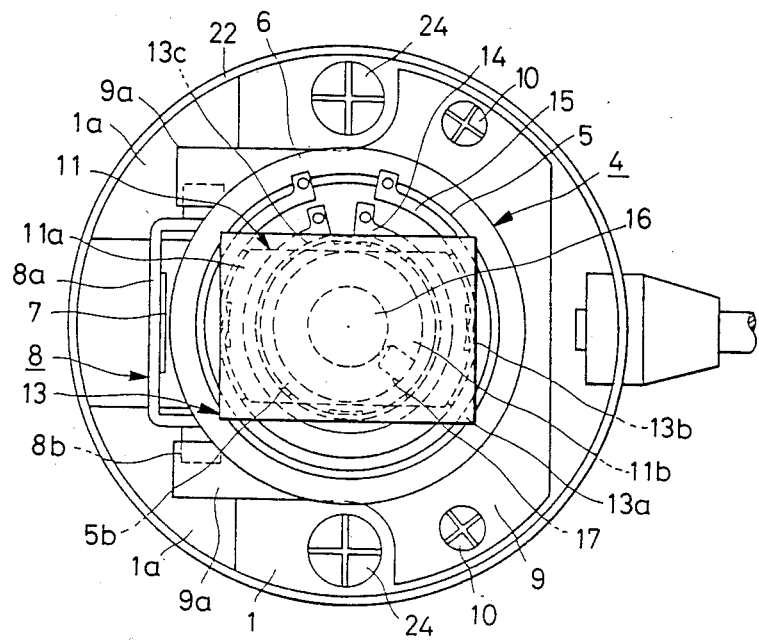
FIG. 1 is a plan view showing the main portion of a magnetic rotary encoder according to an embodiment of the present invention.

Referring now to the drawings, a description will be given in detail of embodiments according to the present invention.

Figure 2:
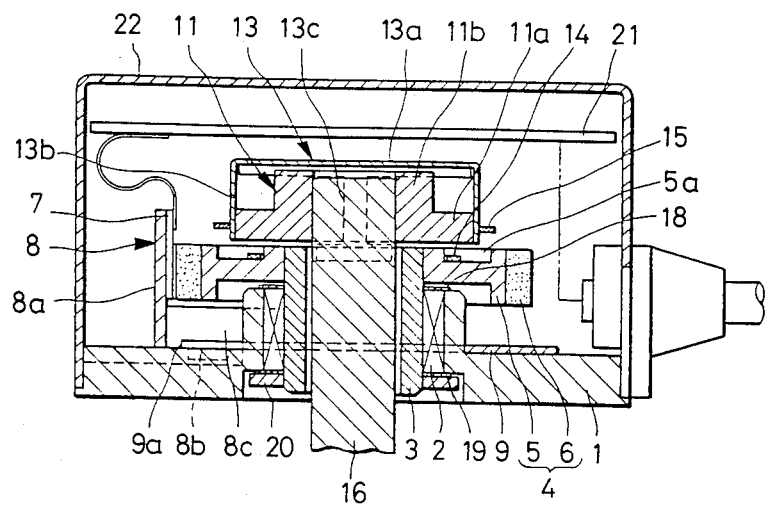
FIG. 2 is a cross sectional view of the main portion of the rotary encoder of FIG. 1.
Figure 3:
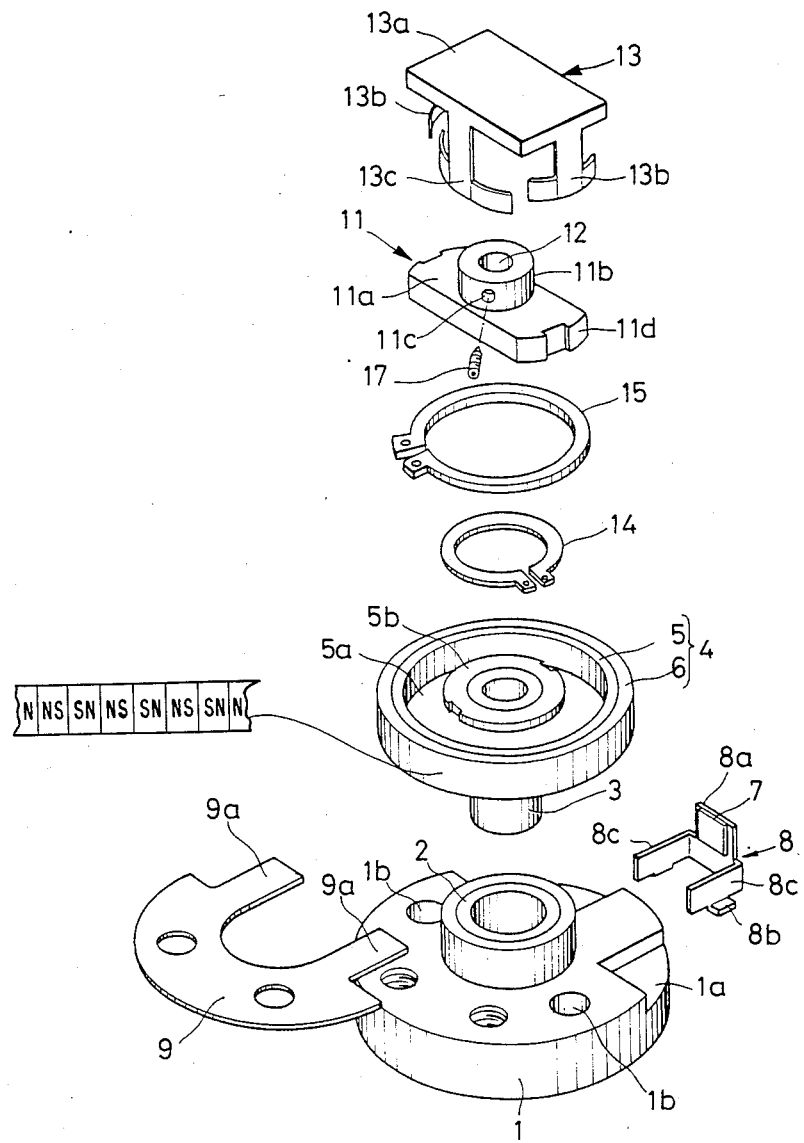
FIG. 3 is a perspective view schematically illustrating the disassembled state of the main portion of the rotary encoder of FIG. 1.

FIG. 1 is a plan view showing the main portion of a magnetic rotary encoder according to an embodiment of the present invention, whereas FIG. 2 is a cross sectional view of the disassembled state of the main portion of the rotary encoder of FIG. 1;

In these diagrams, reference numeral 1 indicates a base manufactured with a metal material such as aluminum and the upper surface of the base 1 is used as a reference plane to mount a sensor retainer to be described later. In the peripheral edge of the base 1, there are formed a pair of grooves 1a each having a U shape, a rotary shaft 3 having a cylindrical shape is supported at a central position of the base 1 by means of an axle bearing 2, and a drum 4 is fixedly secured on an upper end of the rotary shaft 3. The drum 4 comprises such components as a rotating body 5 made of aluminum or the like and a magnetic body 6 including a plastic magnet or the like fixed on the peripheral surface of the rotating body 5 and on the upper surface of the rotary body 5, there is formed a cylinder portion 5b with a u-shaped groove 5a in a ring. On the other hand, in the peripheral surface of the magnetic material 6, a magnetization pattern (not shown) is magnetically fixed thereon according to the magnetic recording technology such that each pair of magnetic poles adjacent to each other possesses the opposite polality like N, S, S, N, N, S, S, N, etc. each arranged at the constant interval or pitch.

Reference numeral 7 denotes a sensor fixedly secured on the sensor retainer 8 and includes two sets of magnetic reluctance effect elements disposed, for example, such that there is developed a phase shift of $np + \frac{1}{4}p$ (n is an integer) for each pitch of magnetic poles of the magnetization pattern. The sensor retainer 8 includes a metal plate undergone a press work so as to a mount surface 8a to mount the sensor 7 and a pair of leg pieces 8c each having an end piece 8b. The mount surface 8a and a bottom surface of these leg pieces 8c form a cross-sectional plane having a shape of ], and the plane is used as the reference surface for the mounting operation. Furthermore, the end piece 8b extending downward from the leg piece 8c is bent outward substantially by an angle of 90° an is located in the U-shaped groove 1a of the base 1.

Reference numeral 9 designates a hold plate mounted on the upper surface of the base 1 by means of screws 10. A free end 9a of the hold plate 9 and the end pieces 8b of the sensor retainer 8 are fixed by use of an adhesive agent. Consequently, the mount reference plane associated with the bottom surface of the sensor retainer 8 receives an elastic force from the hold plate 9 so as to be pressed against the mount reference plane associated with the upper surface of the base 1, which enables to mount the sensor retainer 8 on the upper surface of the base 1 with a highly accurate angle of 90° and hence retains the sensor 7 fixed to the sensor retainer 8 to be kept in a predetermined state with respect to the peripheral surface of the drum 4 as described above.

Reference numeral 11 is a coupling body including a flat plate portion 11a and a cylinder portion 11b standing on the flate plate portion 11a. The cylinder portion 11b has an outer diameter slightly smaller than an outer diameter of the cylinder portion 5b. Moreover, a shaft inserting hole 12 is bored in a central portion of the coupling body 11, a screw hole 11c reaching the shaft inserting hole 12 is formed in the periphery of the cylinder 11b, and a peripheral portion 11d is formed on the sides of the respective opposing shorter edges of the flat plate portion 11a.

Refernce numeral 13 is a link body formed by achiving a bending work on an elastic plate made of a material such as phosphor bronze and includes a flat plate portion 13a having a rectangular shape, a pair of first leg pieces 13b bent downward substantially by an angle of 90° at both short edges of the flat plate portion 13a, a pair of second leg pieces 13c bent downward substantially by an angle of 90° at both long edges of the flat plate portion 13a. Each first leg piece 13b is formed shorter than each second leg piece 13c. The link body 13 is disposed so as to cover the coupling body 11, the bottom ends of the leg pieces 13b are fixedly secured on the peripheral surface of the cylindrical portion 5b by means of a first hold ring 13, and the ends of the second leg pieces 13c are fixedly retained in the peripheral portion 11d of the flat plate portion 11c by use of a second hold ring 15.

Reference numeral 16 indicates a driving shaft as an object of the detecting operation and is a motor shaft of a motor (to be described later) in this embodiment. The driving shaft 16 is inserted into the shaft inserting hole 12 of the coupling body 11 via the rotary shaft 3 and is fixedly attached to the coupling body 11 by tightening a retaining or set screw 17 installed in a screw hole 11c.

Incidentally, the configuration further includes spacers 18–19 respectively arranged at the upper and lower ends of the bearing 2, a hold ring 20 attached to the peripheral surface at the bottom end of the rotary shaft 3, a printed circuit board 21 on which circuit elements (not shown) are mounted, and a cover 22 installed on the base 1.

In the embodiment constructed as described above, when the driving shaft 16 rotates, the driving force thereof is transferred via the coupling body 11 and the link body 13 to the rotary body 5 and as a result the drum 4 turns in a predetermined rotary direction. The sensor 7 arranged on the outside of the peripheral surface of the drum 4 then successively outputs signals each having a phase difference of 90° from the magnetization pattern magnetized on the magnetic material 6 of the drum 4. The signal undergoes processing such as an amplification, a detection, and a matching so as to obtain incremental pulses, thereby detecting the rotary speed and the rotary direction of the drum 4 (i.e. the motor rotating the driving shaft 16 in this embodiment).

Figure 4:
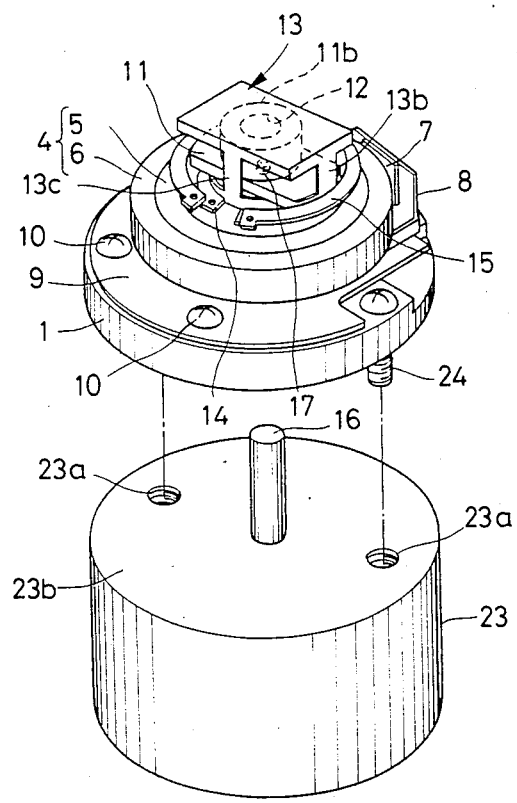
FIG. 4 is a perspective view showing the assembled state of the main portion of the rotary encoder of FIG. 1.
Figure 5:
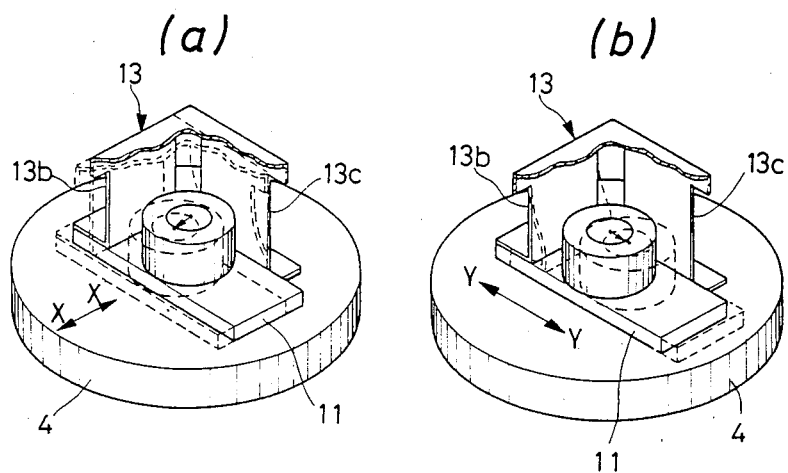
FIGS. 5 (*a*), (*b*), and (*c*) are explanatory diagrams useful to explain operations to absorb the eccentricity.
Figure 5:
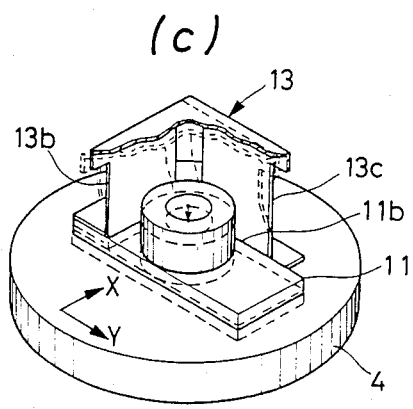

Referring next to FIGS. 4–5, description will be given of the assembly process in which the magnetic rotary encoder thus structured is linked with the driving shaft 16.

First, prior to the link operation, the magnetic rotary encoder is assembled as shown in FIG. 4. In this case, at least the cover 22 must be removed, whereas the printed circuit board 21 (not shown in this figure) may be beforehand mounted if there exists a space enough to tighten the set screw 17. Next, the top end of the driving shaft 16, namely, the motor shaft of the motor 23 is inserted through the rotary shaft 3 into the shaft inserting hole 12 of the coupling body 11 and then a screw 24 is installed into a screw hole 23a of the motor 23 from an upper portion of the mounting hole 1b of the base 1, thereby mounting and fixing the magnetic rotary encoder on the mounting surface 23b of the motor 23. In this operation, the center line of the drum 4 and that of the driving shaft 16 are not always to be aligned on the same line, for example, there may arise eccentricity in the center of each of the drum 4 and the driving shaft 16 because of reasons such as a clearance necessary between the mounting hole 1b and the screw 24. In such a situation, since the leg pieces 13b–13c of the link body 13 are elastically variable in the direction of the respective plate thickness, as indicated by dotted lines in FIG. 5 (a), the second leg pieces 13c deform in the direction of bent line of the first leg pieces 13b (in the direction of the arrow X in FIG. 5 (a)) and the first leg pieces 13b deform, as indicated by dotted lines in FIG. 5 (b), in the direction of the bent line of the second leg pieces 13c (in the direction of the arrow Y in FIG. 5 (b)). Combining these deformation effects, as can be seen from FIG. 5 (c), the coupling body 11 is movable in any direction along a plane (the X-Y plane in the figure) orthogonal to the axis line of the driving shaft 16. Consequently, the eccentricity appearing between the driving shaft 16 and the drum 4 is absorbed when the respective leg pieces 13b–13c elastically deform in the respective directions of the plate thickness.

After the top end of the driving shaft 16 is inserted into the shaft inserting hole 12 of the coupling body 11, the set screw 17 is installed to unify the driving shaft 16 with the coupling body 11; thereafter, if necessary, the printed circuit board 21 is mounted and the wiring operation thereof is achieved and then the cover 22 is installed, thereby mounting the motor 23 on the magnetic rotary encoder.

In the embodiment thus constituted, the respective leg pieces 13b–13c of the link body 13 deform in the respective directions of the plate thickness and hence the eccentricity between the drum 4 and the driving shaft 16 is absorbed in a guaranteed fashion, which enables to link the dringing shaft as the detection object with the drum of the encoder without necessitating to retain the dimensional precision of each component and the mounting precision at a high level.

In addition, since the flat plate portion 13 and the leg pieces 13b–13c constituting the link body 13 each have a high rigidity in a direction orthogonal to the respective plate thickness, the driving force is transferred without causing a loss time between the drum 4 and the driving shaft 16 and hence the detection accuracy of the sensor 7 can be improved.

Moreover, since the link portion between the drum 4 and the driving shaft 16, namely, the coupling body 11 and the link body 13 can be arranged in the cover 22 forming the outer shell of the rotary encoder, the space is saved as compared with the prior art technology in which the linkage is effected by use of the helical coupling at a location outside the rotary encoder, which enables to minimize the size of an apparatus, for example, a copying machine, a printer, or the like on which the rotary encoder is mounted.

Furthermore, since the driving shaft 16 can be linked with the drum 4 only by use of the set screw 17 without necessitating a complex apparatus to adjust the respective centers, the rotary encoder can be easily mounted on the driving shaft and hence the workability is improved.

Figure 6:
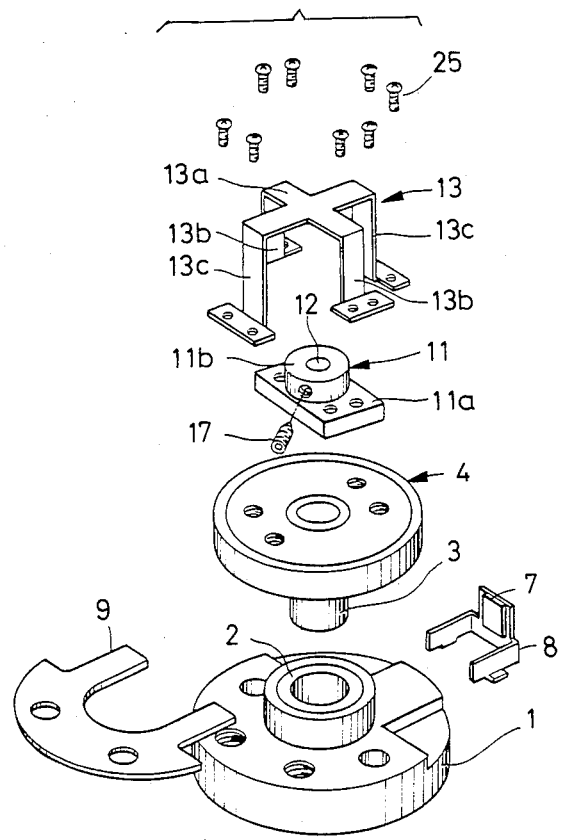
FIG. 6 is a perspective view of a disassembled state of a magnetic rotary encoder according to an alternative embodiment of the present invention.
Figure 7:
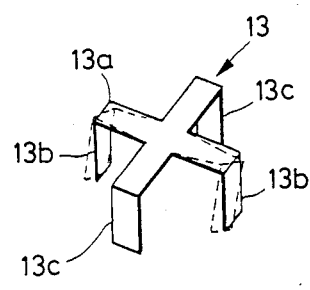
FIG. 7 is an explanatory diagram useful to explain an operation to absorb the declination in the magnetic rotary encoder of FIG. 6.

Incidentally, in the embodiment above, although the description has been given of a case where the link body 13 is formed such that the first and second leg pieces 13b–13c are respectively disposed on the respective opposing edges of the flat plate portion 13a having a rectangular shape and the link body 13 is fixedly secured between the drum 4 and the coupling body 11, the shape of the link body 13 and the fixing means are not restricted by these examples. Namely, when the bent lines connecting the flat plate portion 13a and the respective leg pieces 13b–13c of the link body 13 draw a substantially rectangular shape, for example, as shown in FIG. 6, the link body 13 may include a flat plate portion 13a having a shape of a cross and the leg pieces 13b–13c of the link body 13 may be fixed on the drum 4 and the coupling body 11 by means of the set screw 25. In this embodiment, when the respective leg pieces 13b–13c elastically deform in the respective directions of the plate thickness, the absorption of the eccentricity between the drum 4 and the driving shaft 16 can be guaranteed like in the first embodiment; furthermore, when the flat plate portion 13a distorts as indicated by dotted lines in FIG. 7, the declination between the drum 4 and the driving shaft 16 can be absorbed in a guaranteed fashion.

Moreover, in the embodiment above, although the description has been given of a case where the set screw 17 is employed as means to fix the coupling body 11 on the driving shaft 16, another fixing means such as an adhesive, a pin, or the like may be used in place thereof.

In addition, in the embodiment above, the magnetic rotary encoder is described as an example of the rotary encoder, the present invention is naturally applicable to other types of rotary encoders such as an optical rotary encoder and a mechanical rotary encoder.

According to the present invention, as described above, a simple work in which the driving shaft as the detection object is inserted into the shaft inserting hole of the coupling body enables to gurantee the absorption of the eccentricity caused between the driving shaft and the rotary body; furthermore, the link structure thus configured can be arranged in the rotary encoder, thereby providing a rotary encoder which facilitates the installation thereof and which is suitable for minimization of the installation space thereof.

While the present invention has been described with reference to the particular illustrative embodiments, it is not restricted by those embodiments but only by the appended claims. It is to be understood that those skilled in the art can change and modify the embodiments without departing from the scope and spirit of the present invention.

What is claimed is:

1. A rotary encoder including a recording medium having positional information arranged in a circumferential direction, a sensor disposed opposing said positional information, and a driving shaft linked with a central position of said recording medium for detecting, based on a change in outputs from said sensor, the positional information of said recording medium rotated by means of said driving shaft wherein
   a link body is formed by effecting a bending work on an elastic plate such that there are formed two pairs of opposing bent leg pieces,
   one of said two pairs of the opposing bent leg pieces is fixedly secured on said recording medium and the other one thereof is fixedly secured on a coupling body disposed in the proximity of said recording medium, and said driving shaft is inserted into and fixed on a shaft inserting hole formed in said coupling body.

2. A rotary encoder according to claim 1 wherein said link body is manufactured by effecting a forming work on a plate spring.

3. A rotary encoder according to claim 1 wherein said coupling body is fixedly secured on said driving shaft by means of a set screw.

4. A rotary encoder according to claim 1 wherein said coupling body is fixedly secured on said driving shaft by means of an adhesive.

5. A rotary encoder according to claim 1 wherein said coupling body is fixedly secured on said driving shaft by means of a pin.

* * * * *